United States Patent
Stanich et al.

(10) Patent No.: US 11,077,674 B2
(45) Date of Patent: Aug. 3, 2021

(54) DUAL PASS UNIFORMITY PRINTING COMPENSATION MECHANISM

(71) Applicants: Mikel F. Stanich, Longmont, CO (US); Nikita Gurudath, Boulder, CO (US); Larry Ernst, Longmont, CO (US); William E. Manchester, Erie, CO (US)

(72) Inventors: Mikel F. Stanich, Longmont, CO (US); Nikita Gurudath, Boulder, CO (US); Larry Ernst, Longmont, CO (US); William E. Manchester, Erie, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/557,397

(22) Filed: Aug. 30, 2019

(65) Prior Publication Data

US 2019/0389227 A1 Dec. 26, 2019

Related U.S. Application Data

(63) Continuation of application No. 15/438,075, filed on Feb. 21, 2017, now Pat. No. 10,442,211.

(51) Int. Cl.
*B41J 2/52* (2006.01)
*H04N 1/405* (2006.01)
(Continued)

(52) U.S. Cl.
CPC .............. *B41J 2/52* (2013.01); *G06K 15/027* (2013.01); *G06K 15/105* (2013.01); *G06K 15/18* (2013.01); *H04N 1/405* (2013.01); *H04N 1/603* (2013.01)

(58) Field of Classification Search
None
See application file for complete search history.

(56) References Cited

U.S. PATENT DOCUMENTS 5,457,541 A 10/1995 Burns
5,898,820 A 4/1999 Borg et al.
(Continued)

FOREIGN PATENT DOCUMENTS

JP 2001189874 A 7/2001
JP 2002271623 A 9/2002
(Continued)

OTHER PUBLICATIONS

Vantram, et al., "Fully Automated Calibration Procedure to Compensate Print Non-Uniformities Incurred in Fixed Print-Head Array Structures", Ricoh Technical Report No. 39, Jan. 2014, pp. 154-160.
(Continued)

*Primary Examiner* — Erica S Lin
(74) *Attorney, Agent, or Firm* — Jaffery Watson Mendonsa & Hamilton LLP (57) ABSTRACT

A printing system is disclosed. The printing system includes a printer to print image data to a medium. The printer includes a first pass channel including a first set of pel forming elements to print a first component of the image data and a second pass channel including a second set of pel forming elements to print a second component of the image data, wherein the first component of the image data and the second component of the image data occupy a same region on the print medium. The printing system also includes a print controller to perform uniformity compensation based on a combined compensation of the first pass channel and the second pass channel.

23 Claims, 9 Drawing Sheets

(51) Int. Cl.
*G06K 15/02* (2006.01)
*H04N 1/60* (2006.01)
*G06K 15/10* (2006.01)

(56) References Cited

U.S. PATENT DOCUMENTS

| | | |
|---|---|---|
| 5,936,741 A | 8/1999 | Burns |
| 6,181,445 B1 | 1/2001 | Lin |
| 6,191,867 B1 | 2/2001 | Shor et al. |
| 6,185,004 B1 | 6/2001 | Lin |
| 6,554,388 B1 | 4/2003 | Wong et al. |
| 7,023,580 B2 | 4/2006 | Kitigawa |
| 7,190,490 B2 | 3/2007 | Cooper et al. |
| 7,321,448 B2 | 1/2008 | Nishida et al. |
| 7,417,768 B1 | 8/2008 | Donovan |
| 7,424,169 B2 | 9/2008 | Viassolo et al. |
| 7,431,420 B2 | 10/2008 | Inoue |
| 7,692,832 B2 | 4/2010 | Klassen |
| 7,729,015 B2 | 6/2010 | Mizes et al. |
| 7,780,276 B2 | 8/2010 | Guhse et al. |
| 7,791,760 B2 | 9/2010 | Shimada |
| 7,798,588 B2 | 9/2010 | Arazaki |
| 8,235,490 B2 | 8/2012 | Chandu et al. |
| 8,322,811 B2 | 12/2012 | Chandu et al. |
| 8,432,582 B2 | 4/2013 | Zhang et al. |
| 8,542,418 B2 | 9/2013 | Chandu et al. |
| 8,559,061 B2 | 10/2013 | Kuo et al. |
| 2002/0171852 A1 | 11/2002 | Zhang et al. |
| 2003/0048464 A1 | 3/2003 | Yamada et al. |
| 2003/0128378 A1 | 7/2003 | Cooper et al. |
| 2003/0164960 A1 | 9/2003 | Housel |
| 2004/0002023 A1 | 1/2004 | Sowinski |
| 2004/0145758 A1 | 7/2004 | Lamy et al. |
| 2004/0150844 A1 | 8/2004 | Sanger |
| 2004/0263911 A1 | 12/2004 | Rodriguez |
| 2006/0012809 A1 | 1/2006 | Shimada |
| 2007/0053003 A1 | 3/2007 | Loce |
| 2007/0064042 A1 | 3/2007 | Sugahara |
| 2007/0177231 A1* | 8/2007 | Wang .................. H04N 1/40006 358/504 |
| 2008/0158276 A1 | 7/2008 | Kubota |
| 2008/0186340 A1 | 8/2008 | Koyama et al. |
| 2009/0167813 A1 | 7/2009 | Mitchell et al. |
| 2009/0189928 A1 | 7/2009 | Ino et al. |
| 2010/0110461 A1 | 5/2010 | Hallam |
| 2010/0245867 A1 | 9/2010 | Murata |
| 2011/0013210 A1 | 1/2011 | Yamaguchi |
| 2011/0148968 A1* | 6/2011 | Chandu ................ H04N 1/4078 347/15 |
| 2011/0211008 A1 | 9/2011 | Teshigawara et al. |
| 2011/0235060 A1 | 9/2011 | Tai et al. |
| 2012/0069357 A1 | 3/2012 | Yao |
| 2012/0081436 A1 | 4/2012 | Yamada |
| 2012/0229537 A1 | 9/2012 | Ernst et al. |
| 2013/0176600 A1 | 7/2013 | Chandu et al. |
| 2014/0071497 A1 | 3/2014 | Kuno |
| 2016/0100079 A1 | 4/2016 | Gerrits et al. |

FOREIGN PATENT DOCUMENTS

| | | |
|---|---|---|
| JP | 2003118133 | 4/2003 |
| JP | 2006218638 A | 8/2006 |
| WO | 9317867 | 9/1993 |

OTHER PUBLICATIONS

Vrhel, J.J., et al., "Color Device Calibration: A Mathematical Formulation", IEEE Transactions on Image PRocessing, 8(12), (Dec. 1999), 1796-1806.

Japanese Office Action from JP Application No. 2018-026812, dated Mar. 12, 2019, 4 pages.

Japanese Office Action from JP Application No. 2018-026812, dated Aug. 27, 2019, 4 pages.

* cited by examiner

Figure 3B mult_array(:,:,1) =

| 254 | 230 | 90  | 16  | 2   | 25  | 82  | 222 |
|-----|-----|-----|-----|-----|-----|-----|-----|
| 247 | 214 | 132 | 41  | 8   | 58  | 156 | 189 |
| 99  | 148 | 181 | 140 | 74  | 123 | 173 | 107 |
| 33  | 66  | 165 | 206 | 239 | 197 | 115 | 49  |
| 2   | 25  | 82  | 222 | 255 | 230 | 90  | 16  |
| 8   | 58  | 156 | 189 | 247 | 214 | 132 | 41  |
| 74  | 123 | 173 | 107 | 99  | 148 | 181 | 140 |
| 239 | 197 | 115 | 49  | 33  | 66  | 165 | 206 | mult_array(:,:,2) =

| 252 | 228 | 88  | 14  | 1   | 22  | 80  | 219 |
|-----|-----|-----|-----|-----|-----|-----|-----|
| 244 | 211 | 129 | 38  | 5   | 55  | 154 | 186 |
| 96  | 145 | 178 | 137 | 71  | 121 | 170 | 104 |
| 30  | 63  | 162 | 203 | 236 | 195 | 112 | 47  |
| 1   | 22  | 80  | 219 | 252 | 228 | 88  | 14  |
| 5   | 55  | 154 | 186 | 244 | 211 | 129 | 38  |
| 71  | 121 | 170 | 104 | 96  | 145 | 178 | 137 |
| 236 | 195 | 112 | 47  | 30  | 63  | 162 | 203 | mult_array(:,:,3) =

| 250 | 225 | 85  | 11  | 0   | 19  | 77  | 217 |
|-----|-----|-----|-----|-----|-----|-----|-----|
| 241 | 208 | 126 | 36  | 3   | 52  | 151 | 184 |
| 93  | 143 | 175 | 134 | 69  | 118 | 167 | 101 |
| 27  | 60  | 159 | 200 | 233 | 192 | 110 | 44  |
| 0   | 19  | 77  | 217 | 250 | 225 | 85  | 11  |
| 3   | 52  | 151 | 184 | 241 | 208 | 126 | 36  |
| 69  | 118 | 167 | 101 | 93  | 143 | 175 | 134 |
| 233 | 192 | 110 | 44  | 27  | 60  | 159 | 200 |

| Large  | MTA_array(:,:,1) |
|--------|------------------|
| Medium | MTA_array(:,:,2) |
| Small  | MTA_array(:,:,3) |
| None   |                  |

DUAL PASS UNIFORMITY PRINTING COMPENSATION MECHANISM

CLAIM OF PRIORITY

The present patent application is a Continuation application claiming priority from application Ser. No. 15/438,075, filed Feb. 21, 2017, which is currently pending.

FIELD OF THE INVENTION

The invention relates to the field of image reproduction, and in particular, to digital halftoning.

BACKGROUND

Dual pass printing systems utilize two separate channels to produce an input image. The two channels operate independently to transfer the same information with each channel outputting half of the marking material (e.g., ink) such that the combination generates the final output. The redundancy offered by the two channels improves print quality, resulting in an output with higher optical density.

Uniformity compensation in such a system considers each of the single channels as independent primary colors and the dual pass print as an enhanced higher density primary. This concept holds for an ideal system if as in the case of an ink jet printer, every dot jetting out from a nozzle were to land in an exact location, and if the superposition theorem (e.g., optical density from ink jetted from two independent channels equals the optical density of the dual pass ink dot) were true. However since a printer operates in a real-world environment, exact dot placement is not always guaranteed due to dot-on-dot phenomenon (e.g., paper skew, web skew, hardware defects such as deviated jets or jet outs, hardware adjustments such as magnification, etc.). Thus, compensating a dual pass print by utilizing the individual channels does not provide optimum print quality.

Accordingly, a dual pass uniformity compensation mechanism is desired.

SUMMARY

In one embodiment, a printing system is disclosed. The printing system includes a printer to print image data to a medium. The printer includes a first pass channel including a first set of pel forming elements to print a first component of the image data and a second pass channel including a second set of pel forming elements to print a second component of the image data, wherein the first component of the image data and the second component of the image data occupy a same region on the print medium. The printing system also includes a print controller to perform uniformity compensation based on a combined compensation of the first pass channel and the second pass channel.

In a further embodiment, a method is disclosed. The method includes performing uniformity compensation based on a combined compensation of a first pass channel including a first set of pel forming elements to print a first component of image data and a second pass channel including a second set of pel forming elements to print a second component of the image data, wherein the first component of the image data and the second component of the image data occupy a same region on the print medium.

BRIEF DESCRIPTION OF THE DRAWINGS

A better understanding of the present invention can be obtained from the following detailed description in conjunction with the following drawings, in which.

DETAILED DESCRIPTION

A dual pass uniformity compensation printing mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
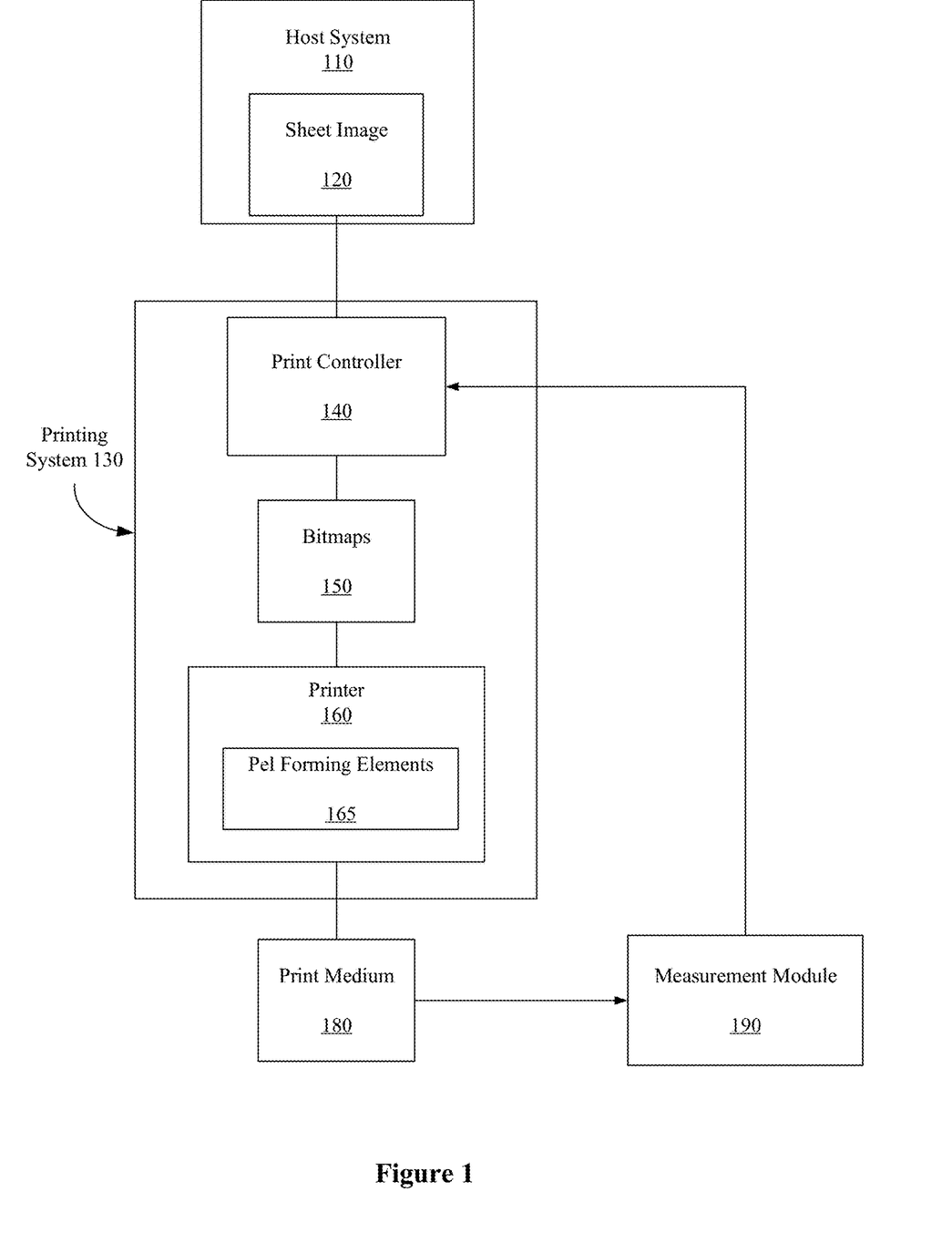
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. Print medium 180 may be paper, card stock, paper board, corrugated fiberboard, film, plastic, synthetic, textile, glass, composite or any other tangible medium suitable for printing. The format of print medium 180 may be continuous form or cut-sheet or any other format suitable for printing. Printer 160 may be an ink jet, electrophotographic or other suitable printer type.

In one embodiment, printer 160 comprises one or more pel forming elements 165 that directly or indirectly (e.g., by transfer) forms the pels on the print medium 180 with marking material applied to the print medium. In an ink jet printer, the pel forming element is a tangible device that may be an ink jet nozzle and in an electro photographic (EP) printer the pel forming element may be an EP exposure LED or an EP exposure laser. Further, printer 160 is a multi-pass printer (e.g. dual pass, 3 pass, 4 pass, etc.) wherein multiple sets of pel forming elements each print the same region of the print image on the print medium 180. A pass is the completed printing of the image region by a set of pel forming elements. The set of pel forming elements may be located on the same physical structure (e.g., an array of nozzles on an ink jet print head) or separate physical structures. The resulting print medium 180 may be printed in color and/or in any of a number of gray shades using one or more dual pass approaches, including black and white. Marking materials may be inks or toners in process colors (e.g., Cyan, Magenta, Yellow, and blacK, (CMYK) or clear). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate multiple bitmaps 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmaps 150 onto the print medium 180 with marking materials (e.g., via toner, ink, etc.) based on the sheet image 120.

The print controller 140 may be any system, device, software, circuitry and/or other suitable component operable to transform the sheet image 120 for generating multiple bitmaps 150 in accordance with printing onto the print medium 180. In this regard, the print controller 140 may include processing and data storage capabilities. In one embodiment, measurement module 190 is implemented to obtain measurements of the printed medium 180. The measured results are communicated to print controller 140 to be used in a halftone calibration process to perform dual pass uniformity compensation. The measurement system may be a stand-alone process or be integrated into the printing system 130.

Figure 2:
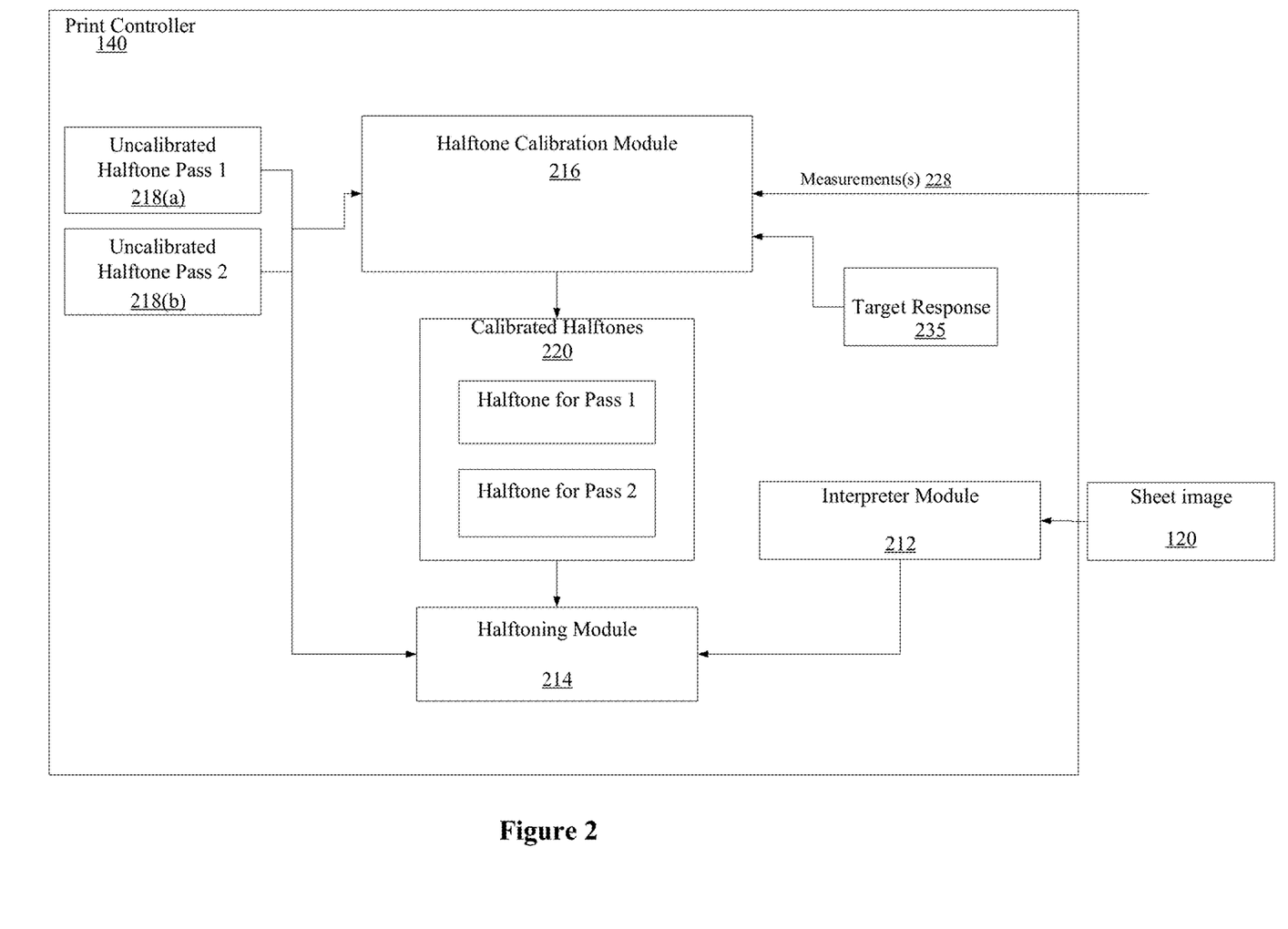
FIG. 2 is a block diagram of one embodiment of a print controller.

FIG. 2 is a block diagram illustrating an exemplary print controller 140. The print controller 140, in its generalized form, includes an interpreter module 212, a halftoning module 214, and a halftone calibration module 216. These separate components may represent hardware used to implement the print controller 140. Alternatively or additionally, the separate components may represent logical blocks implemented by executing software instructions in a processor of the printer controller 140.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 are each a 2-dimensional array of pels representing an image of the print job (i.e., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines.

The halftoning module 214 is operable to represent the sheetside bitmaps as halftone patterns of ink or toner. For example, halftoning module 214 may convert the continuous tone image pels to halftone pattern image data of CMYK ink or toner for application to the paper. Thus, halftoning module 214 converts a single contone image to multiple binary/multi-bit level halftone images at the same dots per inch (dpi) as the contone image in a dual pass system. This requires the use of multiple halftones, one for each pass. Binary halftone image refers to an image having only a single pel forming element output (e.g. ink drop) size, not including none. Multi-bit refers to when the halftoned image has more than one pel forming element output (e.g. ink drop) size, not including none. The resulting halftone images are used to drive a dual pass pel forming elements of the printer 160, which operates at the same dpi as the halftone image data. The dpi of the halftones for different passes need not be the same. Thus, the dpi need only match the dpi of the respective pel forming elements (e.g. ink jet printheads). Additionally, any combination of binary and multi-bit halftones for the different passes is allowed. The halftone bitdepth needs to only match the bitdepth of the respective pel forming elements.

Figure 3A:
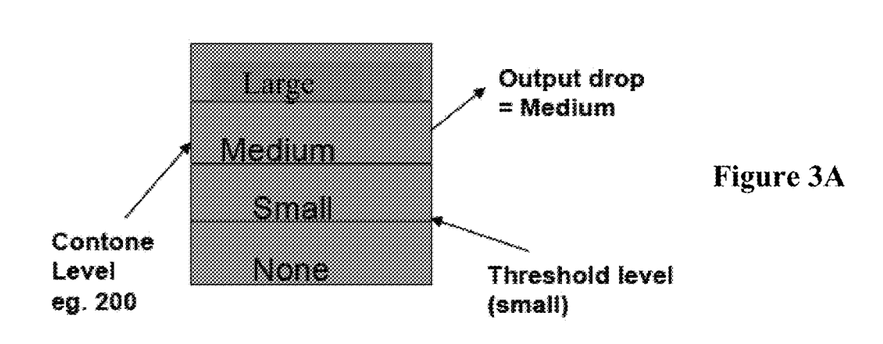
FIGS. 3A & 3B illustrate embodiments of calibrated and un-calibrated halftone output levels.

FIG. 3A illustrates one embodiment of halftone output levels. As shown in FIG. 3A, there are four possible output levels (Large, Medium, Small and None). Further, each output level for a given pel is uniquely defined based on thresholds for each drop size and the image contone level for the corresponding pel of contone image data. The term drop is used herein to refer to the pel forming element 165 output, though other pel forming elements 165 outputs are equally applicable. A halftone design comprises a set of thresholds which define the output levels for a collection of pels corresponding to input image levels. The set of thresholds for a halftone is defined to be a threshold array (TA). A system having multiple colors includes halftones for each color plane. FIG. 3A depicts the output level for a single corresponding pel of image contone data.

Halftone calibration module 216 performs a calibration process separately on uncalibrated halftones 218 for each pass individually using the same calibration data received at print controller 140 to generate one calibrated halftone 220 for each pass. In one embodiment, different halftones are employed for each pass channel of a dual pass system. Thus, the first calibrated halftone (halftone for Pass 1) is used for a first set of pel forming elements 165 of printer 160 (first pass channel), and a second calibrated halftone (halftone for Pass 2) is used for a second set of pel forming elements 165 (second channel), to print an image where image data from each pass separately prints the same region of the image data on the print medium 180. Calibrated halftones 220 are then received at halftoning module 214 along with the sheetside bitmap.

The uncalibrated halftones 218 refer to reference halftone designs for each individual pass that are modified to create the calibrated halftones for the respective passes. Measurements of the system response are measured using the uncalibrated halftones printing in a dual pass mode. In one embodiment, uncalibrated halftones are implemented by halftoning module 214 to obtain measurements for default printing in a dual pass printing system 130.

Figure 3B:
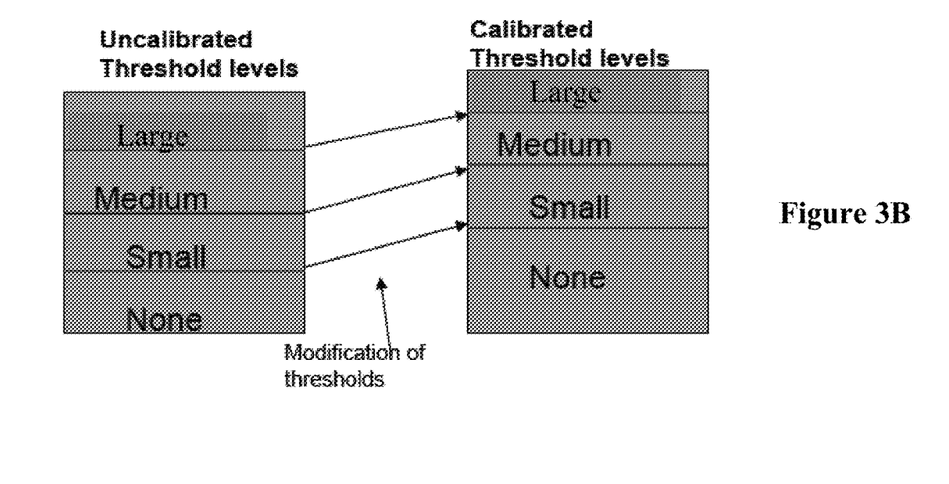

FIG. 3B illustrates one embodiment of halftone output levels for uncalibrated and calibrated halftones implemented by calibration module 216 for one pel of a single threshold array (TA). As shown in FIG. 3B, calibration involves modification of threshold levels between uncalibrated and calibrated halftones. Uncalibrated and calibrated halftones include threshold values for an entire array width (e.g., in a continuous forms printer, 256×25600×thresholds for a 2-bit output level system; where 256 pels is in the direction of web movement, 25600 is the number of pel forming elements 165 (e.g. nozzles) in an ink jet printhead array in the cross-web direction and 3 is the number of threshold levels). The number of threshold levels is one less than the total number of drop sizes including none. Each halftone design includes a unique halftone TA.

Figure 4:
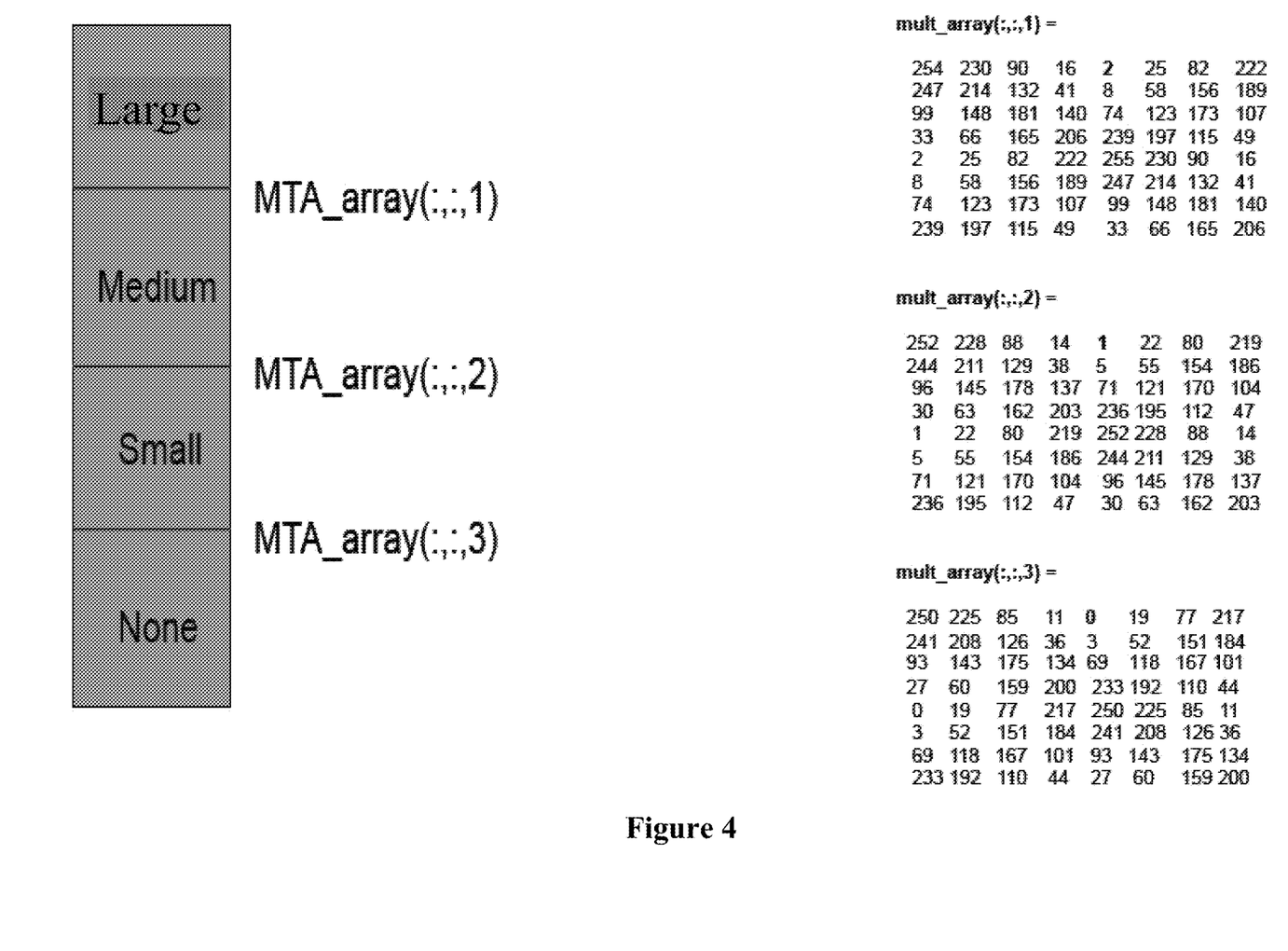
FIG. 4 illustrates one embodiment of multi-bit threshold arrays.

In one embodiment, the calibration is performed using multi-bit threshold arrays (MTAs). FIG. 4 illustrates one embodiment of such MTAs. In one embodiment, the maximum value of an MTA is 254, while a minimum value is 0. A maximum value of 254 ensures all large drops are produced at the end of the tonal range by the halftone operation for a level 255. A maximum value of 255 may in some cases be desirable to achieve maximum OD (Dmax) reductions to avoid loss of gray levels where the printer produces an OD which is less than the maximum possible value achievable by the printing process. The Dmax is defined by the target response OD function. Multiple MTAs are implemented for dual pass printing.

For multi-bit halftones, the MTA is a three-dimensional array consisting of one two-dimensional array for each drop size transition. Thus it includes a set of two-dimensional arrays of thresholds for transition between drop sizes: MTA_array(:,:,1) plane one provides the threshold for the Large output level, while MTA_array(:,:,2) plane 2 and MTA_array(:,:,3) plane 3 provide thresholds for the Medium and Small output levels respectively for a system having three drop sizes not including none.

The number of planes of threshold data can be extended to handle any number of drop sizes. The data of these two-dimensional arrays may be segmented into separate memory regions and stored in any convenient order. For example, the thresholds for each drop size transition may be stored contiguously in memory, and it is often advantageous to do so.

The multi-bit halftoning relationship is represented as Large drop: I>MTA_array(:,:,1); Medium drop: I>MTA_array(:,:,2) & I<=MTA_array(:,:,1); Small drop: I>MTA_array(:,:,3) & I<=MTA_array(:,:,2); and None: I<=MTA_array(:,:,3); where I is the matrix of image contone levels corresponding to the same spatial set of pels which are being halftoned. This defines a point operation which, in turn, defines the output drop size given the contone level for the pel being halftoned. For the case of dual pass printing, the same image data I is employed with different halftones to render the halftoned image for each pass.

Halftoning is a bit depth reduction process where the bit depth of the contone data, typically 8 is reduced to a lower value, in this case 2 for a four-level system. Values for a small example 8×8×3 threshold array are shown in FIG. 4. Thresholds increase for the same row and column for each plane 3 to 2 to 1. This satisfies the halftone stacking condition, which states that output levels must always monotonically increase with increasing contone levels for a single pel. The stacking condition only requires a weakly increasing monotonic drop size behavior, which permits for a single pel repeating the same drop size for some portions of the tone range. Satisfying the stacking condition is also evident from the totem pole representations shown in FIGS. 3A and 3B, which produces a weakly monotonic sequence of drop sizes for the entire tone range.

According to one embodiment, halftone calibration module 216 generates the appropriate threshold values for the calibrated threshold arrays based on un-calibrated threshold arrays using an inverse transfer function (ITF) approach. Thus, halftone calibration module 216 generates calibrated halftones directly from the un-calibrated halftones employing an inverse transfer function by transforming the un-calibrated threshold values to new calibrated halftone threshold values. This process is performed without having to convert to a different halftone representation (e.g. 3D LUT), calibrate and subsequently convert back to a threshold representation. The transfer function (TF) relates the contone level mapping required to achieve the target response based on the measured data response. The ITF, used for modifying halftone threshold, is the inverse of the TF functional relationship.

This calibration can be performed on a global basis for all values of the threshold arrays, for example based on average full web width dual pass measurement data 228. In this case, all pel forming elements 165 (e.g., nozzles) for both passes are being calibrated to a target response 235 employing a single set of dual pass measurement data 228. In a different embodiment, the calibration is performed on the threshold array values for a single column of data for all planes. This permits dual pass uniformity compensation of two corresponding pel forming elements (e.g., nozzles), one from each printing pass. This approach permits local calibration of the dual pass printing system to compensate for measured response differences at a single pel, where a single pel is effectively printed using two corresponding pel forming elements 165 (e.g., printhead nozzles).

This type of local calibration is referred to as uniformity compensation. While two passes are referred to in the previous descriptions of calibration approaches, two or more passes can be calibrated in a similar fashion with combined compensation of each pass channel of printer 160. Wherein, the combined compensation is based on the common measurement data 228 for the combined passes employed in the ITF calculations, and applied to calibrate each individual pass. In one embodiment, the common measurement data 228 is measured for the region of the combined printed image on print medium 180 printed by each pass channel of printer 160. The relative contributions of marking material (e.g., ink) from each pass do not influence the calibration process. Some individual passes can weakly contribute to the overall ink amount of ink being printed without affecting the final calibration results. Furthermore, a single pass could be coarse and the second pass fine to obtain a final more precise result. In a further embodiment, the individual marking materials (e.g., inks) for the two passes do not have to contain the same color.

A traditional mixture of primary colors to create a secondary color is also allowed using the same dual pass calibration approach. For example, the first pass could include Cyan, while the second pass includes Magenta to generate a Blue secondary color. Using a Blue target response for OD, the calibration for the Cyan and Magenta passes is computed using ITF approach for each pass. Similarly, the same approach may be applied to generate calibrated Green using Cyan and Yellow passes and calibrated Red using Magenta and Yellow passes.

Figure 5:
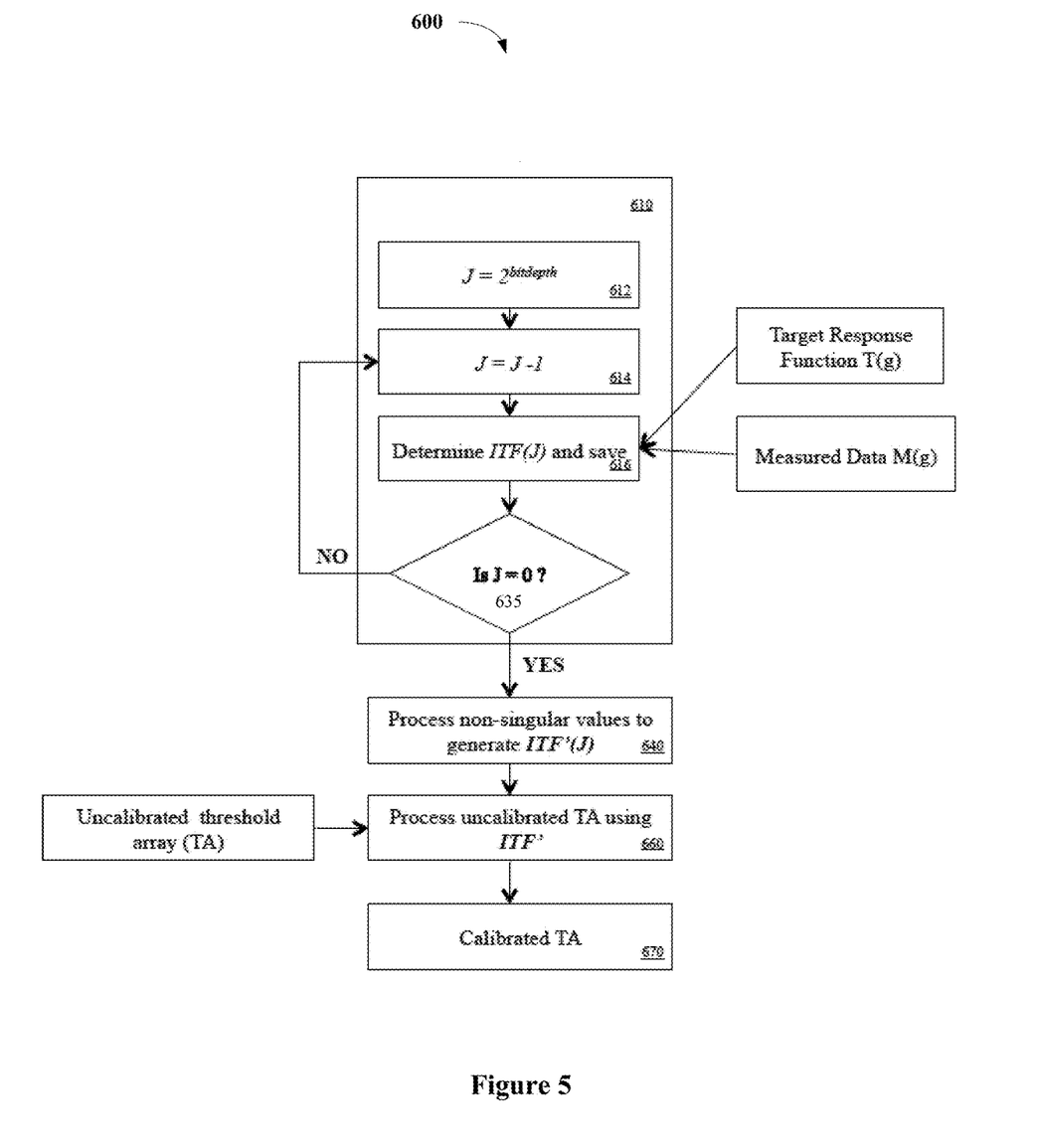
FIG. 5 is a flow diagram illustrating one embodiment of a halftone calibration process.

FIG. 5 is a flow diagram illustrating one embodiment of a process 600 for halftone calibration. Process 600 may be performed by processing logic that may include hardware (e.g., circuitry, dedicated logic, programmable logic, microcode, etc.), software such as instructions run on a processing device, or a combination thereof. In one embodiment, process 600 is performed by halftone calibration module 216.

At processing block 610, an inverse transfer function is generated. To produce a calibrated halftone threshold array, the inverse transfer function is computed for every gray level (J), processing block 612, in which the highest gray level achievable is defined. Values as high as (2^bitdepth)−1 are permitted, 255 for an eight-bit system. Thus at processing block 614, the new J value is calculated. Subsequently, the inverse transfer function at this J value is determined from a target response and measured response and saved, processing block 616. This operation continues until I equals zero. Thus at decision block 635, a determination is made as to whether J equals 0. While this process uses integer values, non-integer values or higher bit-depth can be employed to obtain a more accurate estimate to facilitate calibration of higher bit-depth halftones.

Process 600 is applied to each individual pass to derive its calibrated halftone for that pass. A common target response 235 is used as an input for each pass, along with the measured response 228 for the combined passes. The individual respective uncalibrated halftones 218(a) and 218(b) are employed in the process to derive the respective calibrated halftones for all of the individual passes. Assuming a dual pass monochrome system, the process depicted by 600 is repeated twice to calibrate the individual passes. Most of the individual steps are the same for each pass to derive ITF', therefore only processing of the individual halftones at 660 is required to generate the calibrated halftone for each individual pass. In one embodiment, the number of repeats of this calibration matches the number of passes and uncalibrated halftones 218, one per pass.

The halftone that is employed in block 214 has an input image bit-depth that matches the bit-depth of the contone image generated by the interpreter module 212. If the halftones from each pass have different bitdepths, interpreter module 212 generates an input image bitdepth that matches the bitdepth for that pass. For example, one pass has a bitdepth of 8 and the second pass has a bitdepth of 12. If I equals zero, the non-singular values are processed to obtain ITF'(J), processing block 640. In one embodiment, ITF' represents the inverse transform result after non-singular value processing. In other embodiments, this process could be performed at processing block 616. At processing block 660, the un-calibrated threshold array is processed. This calibration process is repeated for each uncalibrated halftone 218 to generate an entire set of calibrated halftones 220.

In one embodiment, the processing at block 660 is a simple 1D Look up table operation where all threshold levels from the un-calibrated threshold array are given replacement values defined by ITF'. For the case of a multi-bit threshold array having multiple planes this is all values for the entire array. No changes to processing for different planes of the array are required. In a further embodiment, where the calculations are performed at a higher bitdepth or smaller discrete intervals, continuous function approximations can be derived. At this stage converting the continuous function result to a discrete integer representation can be performed. At processing block 670, the calibrated threshold array is generated.

Figure 6:
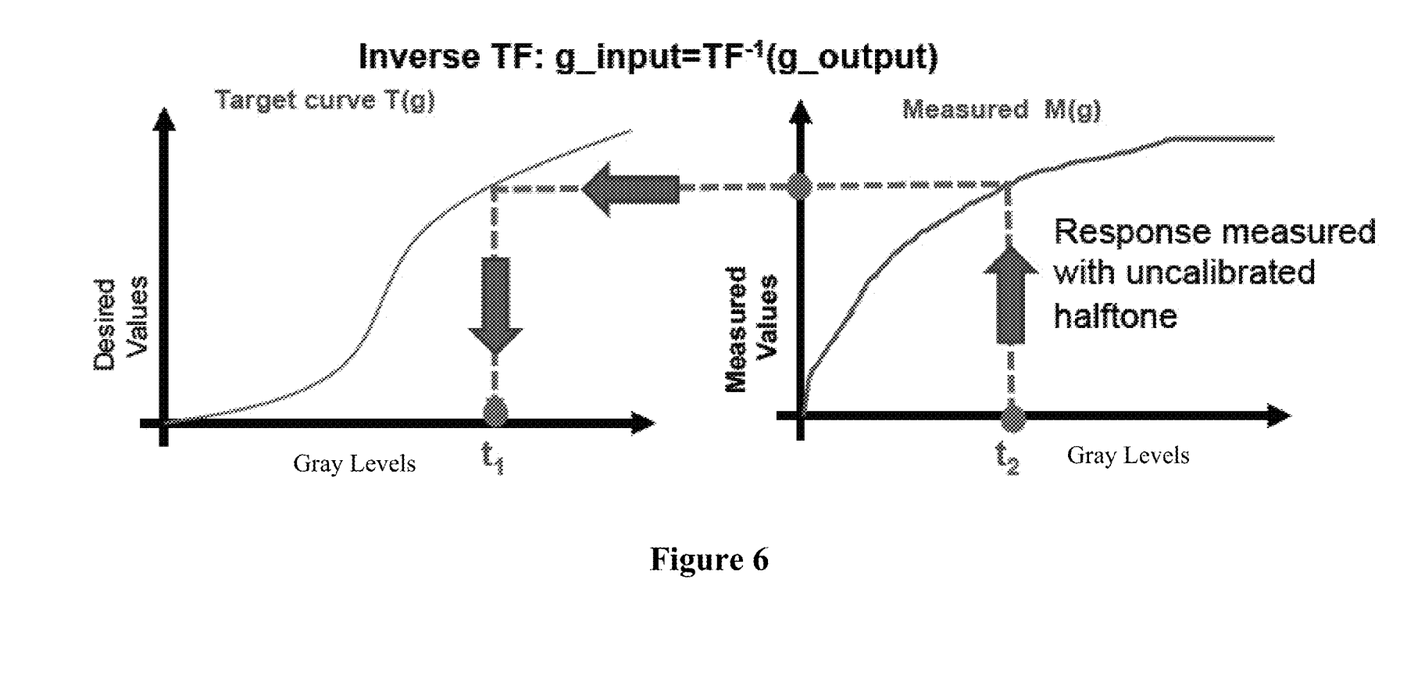
FIG. 6 illustrates one embodiment of an inverse transfer function.

FIG. 6 illustrates one embodiment of deriving an inverse transfer function (ITF). This ITF relationship in turn is employed to generate a calibrated MTA "CAL_MTA_array" from the un-calibrated threshold array by applying an inverse transfer function transform to each of the threshold levels of the un-calibrated MTA "MTA_array".

In one embodiment, halftoning module 214 compares the image data (I) at each pel for the sheetside bitmap to the respective threshold data for each plane, where each plane defines thresholds for a particular drop size (e.g., Planes 1, 2, and 3 represent the thresholds for the drop size determination). To obtain threshold values for the entire sheetside bitmap the threshold array is tiled to at least cover the entire bitmap. In one embodiment, the multi-bit halftoning relationship is represented as Large drop: I>MTA_array(:,:,1); Medium drop: I>MTA_array(:,:,2) & I<=MTA_array(:,:,1); Small drop: I>MTA_array(:,:,3) & I<=MTA_array(:,:,2); and None: I<=MTA_array(:,:,3).

As discussed above with reference to processing block 660, calibrated thresholds are calculated. The calculations result in the final set of Calibrated MTA threshold values: CAL_MTA_array(:,:,1)=TF$^{-1}$(MTA_array(:,:,1)); CAL_MTA_array(:,:,2)=TF$^{-1}$(MTA_array(:,:,2); and CAL_MTA_array(:,:,3)=TF$^{-1}$(MTA_array(:,:,3)). Therefore, generalizing for any set of threshold data having any number of drop sizes or planes results in CAL_MTA_array=TF$^{-1}$(MTA_array).

Figure 7:
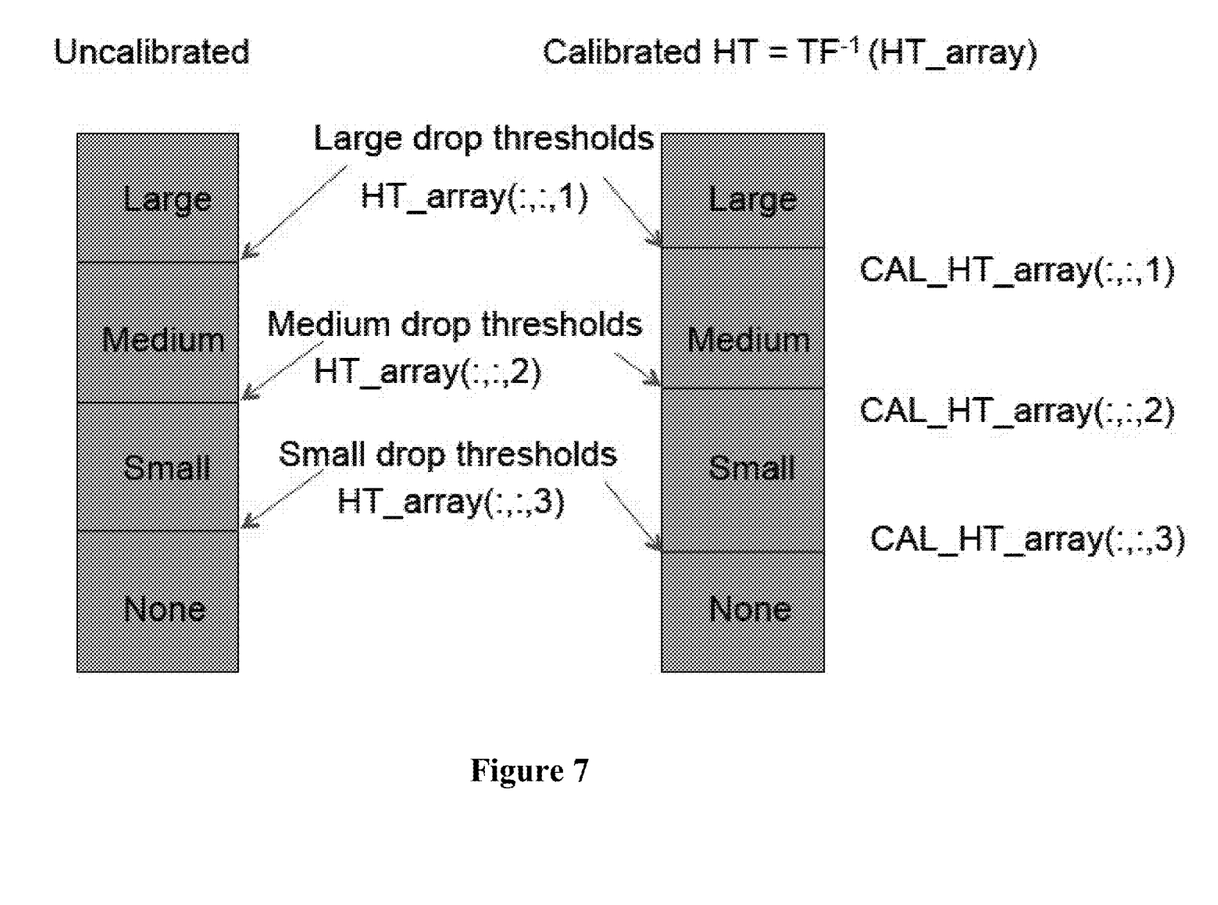
FIG. 7 illustrates one embodiment of uncalibrated and calibrated multi-bit halftone output levels.

In one embodiment, for a Large drop, I>TF$^{-1}$(MTA_array (:,:,1)). Similarly, for Medium, Small and None thresholds I >TF$^{-1}$(MTA_array(:,:,2)) & I<=TF$^{-1}$(MTA_array(:,:,1)); I>TF$^{-1}$(MTA_array(:,:,3)) & I<=TF$^{-1}$(MTA_array(:,:,2)); and None: I<=TF$^{-1}$(MTA_array(:,:,3)), respectively. FIG. 7 illustrates one embodiment of a mapping between calibrated and un-calibrated multi-bit halftone output levels for each individual pass using the inverse transfer function. This is illustrated for a single pel of the threshold array data in FIG. 7.

Transforming threshold array values using an inverse of the transfer function may result in calibration with fewer gray levels because inverse transfer functions are not single valued functions. This occurs due to the weak monotonicity of the ITF. This reduced number of gray levels occurs if the transfer function is not strictly monotonic or the sequence of input numbers representing the function is not adequate where "flat spots" in the transfer function may exist, having the same output value for multiple input values. To help reduce the potential for "flat spots" increasing the input number of levels provides a much better approximation of the ITF.

If the number of ITF terms is increased, the image data is upsampled to increase the halftone bitdepth to form a consistent set. As discussed above with reference to processing block 640, non-singular values are processed to produce the same results as the LUT halftone calibration method. This would be the case where it is desired to match the results of the LUT halftone calibration method, which is not always a requirement.

According to one embodiment, the above-described ITF mechanism is performed by halftone calibration module 216 to generate calibrated halftones 220 that are used to perform dual pass uniformity printing compensation. Thus, uniformity compensation is performed as a total dual pass based compensation. In one embodiment, dual pass measurements averaged for the entire web width are used to obtain a single ITF that is used to provide mathematically accurate compensation for every individual pel forming element 165 (e.g., nozzle) to compensate for average printer response changes. This data is then replicated and applied to both single pass channels.

Halftone calibration is performed to a desired target using the above-described ITF method. In a further embodiment, the measured response for multiple localized region is determined, usually corresponding to a single respective pel from each pass, which generates multiple ITFs. These ITFs are then applied to compensate both halftone arrays for the localized region corresponding to the measurement. Columns of threshold data for all planes are employed in this calibration, where the columns correspond to the printed regions which were measured.

In a further embodiment, localized uniformity calibration is performed to generate uniformity calibrated halftones for each pass. This compensates for local differences between pel forming elements 165 (e.g., nozzles) from each pass. This calibrated halftone can then be periodically recalibrated on a global basis, for example using edge sensor data, to compensate for global changes to the process. In such an embodiment, global and local printer system changes are compensated.

Figure 8:
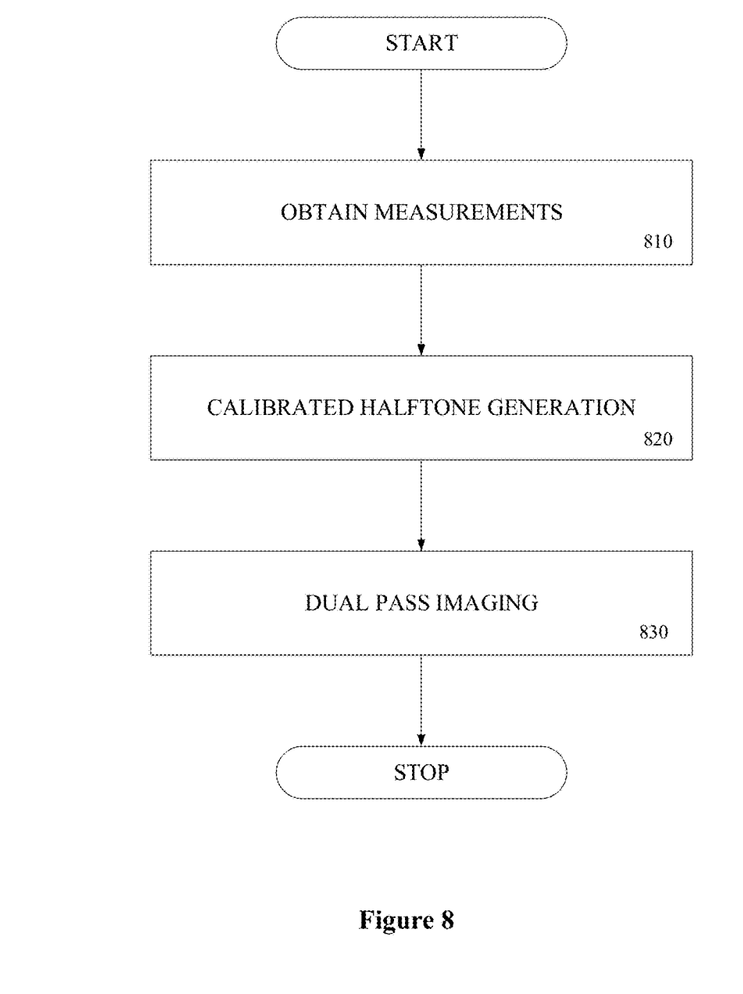
FIG. 8 is a flow diagram illustrating one embodiment of a process to perform dual pass uniformity printing compensation.

FIG. 8 is a flow diagram illustrating one embodiment of a process to perform dual pass uniformity printing compensation. At processing block 810, measurements are obtained for default printing across print medium 180. In one embodiment, dual pass measurements are performed to obtain a single ITF, which is used to provide mathematically accurate compensation for each individual pel forming element 165 (e.g., nozzle) for the printed region of interest covered by the measurements.

To obtain the measurements a test chart is received at print controller 140 as an input image. Subsequently, halftoning is performed at halftoning module 214 to generate halftone image data. In one embodiment, a first halftoning operation is performed on the test image using a first uncalibrated halftone 218 to generate first halftone image data, and a second halftoning operation is performed on the test image using a second uncalibrated halftone 218 to generate second halftone image data.

In such an embodiment, the first halftone image data is used to drive a set of pel forming elements 165 (e.g., ink jet nozzles at a printhead) in the first pass channel (or first pass) of printer 160, while the second halftone image data is used to drive a different set of pel forming elements (e.g., ink jet nozzles) in the second pass channel (or second pass). As a result, the first pass channel and the second pass produce a combined image on print medium 180 based on the same image data.

In one embodiment, the first set of pel forming elements (e.g., ink jet nozzles) and the second set of pel forming elements 165 (e.g., ink jet nozzles) are located on the same structure (e.g., printhead). However in other embodiments, the first set of pel forming elements 165 (e.g., ink jet nozzles) and the second set of pel forming elements 165 (e.g., ink jet nozzles) may be located on a different structure (e.g., printhead). In yet a further embodiment, the first set of pel forming elements 165 (e.g., ink jet nozzles) and the second set of pel forming elements 165 (e.g., ink jet nozzles) may form (e.g., eject) the same marking material (e.g., ink color/type), or a different marking material (e.g., ink (color/type).

Referring to FIG. 8, calibrated halftones are generated using the dual pass output image created by the first and second passes using the above-described ITF process, processing block 820. In one embodiment, ITFs for each pel forming element (e.g., nozzle) are generated based on measured and target responses for each pel forming element 165 (e.g., nozzle) of the entire set of pel forming elements 165 (e.g., printhead array), for each pass. In a further embodiment, a single target response is used (e.g., linear optical density (OD)). As a result, calibrated halftones 220 are generated. A first calibrated halftone (e.g., halftone for pass 1) is used for halftoning the first pass and a second calibrated halftone (e.g., halftone for pass 2) is used for halftoning via the second pass.

Once generated, the calibrated (or compensated) halftones 220 are implemented in the imaging path generated from a single dual combined response, processing block 830. Printing is done using the calibrated halftone until such time as a recalibration is performed, where replacement halftones are generated and used. In one embodiment, an input contone image is replicated and transmitted to pass 1 and pass 2. In such an embodiment, pass 1 and pass 2 may have significantly different characteristics that are correctly compensated.

The above-described process may also be implemented to compensate for secondary colors to achieve a target tonal response and/or hue angle. In this embodiment, the resulting compensation is combined with the compensation of primary colors. Accordingly, each channel represents a primary color, such that pass 1 is a first color and pass 2 is a second color. However in other embodiments, this concept may be extended to three or more color combinations. For instance, the color compensation may be applicable to seven color printing systems that are used to calibrate the red-green-blue (RGB) colors for a given target response. In such a case the ITF process is repeated for each channel of the process, for example combining three colors to produce a secondary color for a 7-color printing system.

Figure 9:
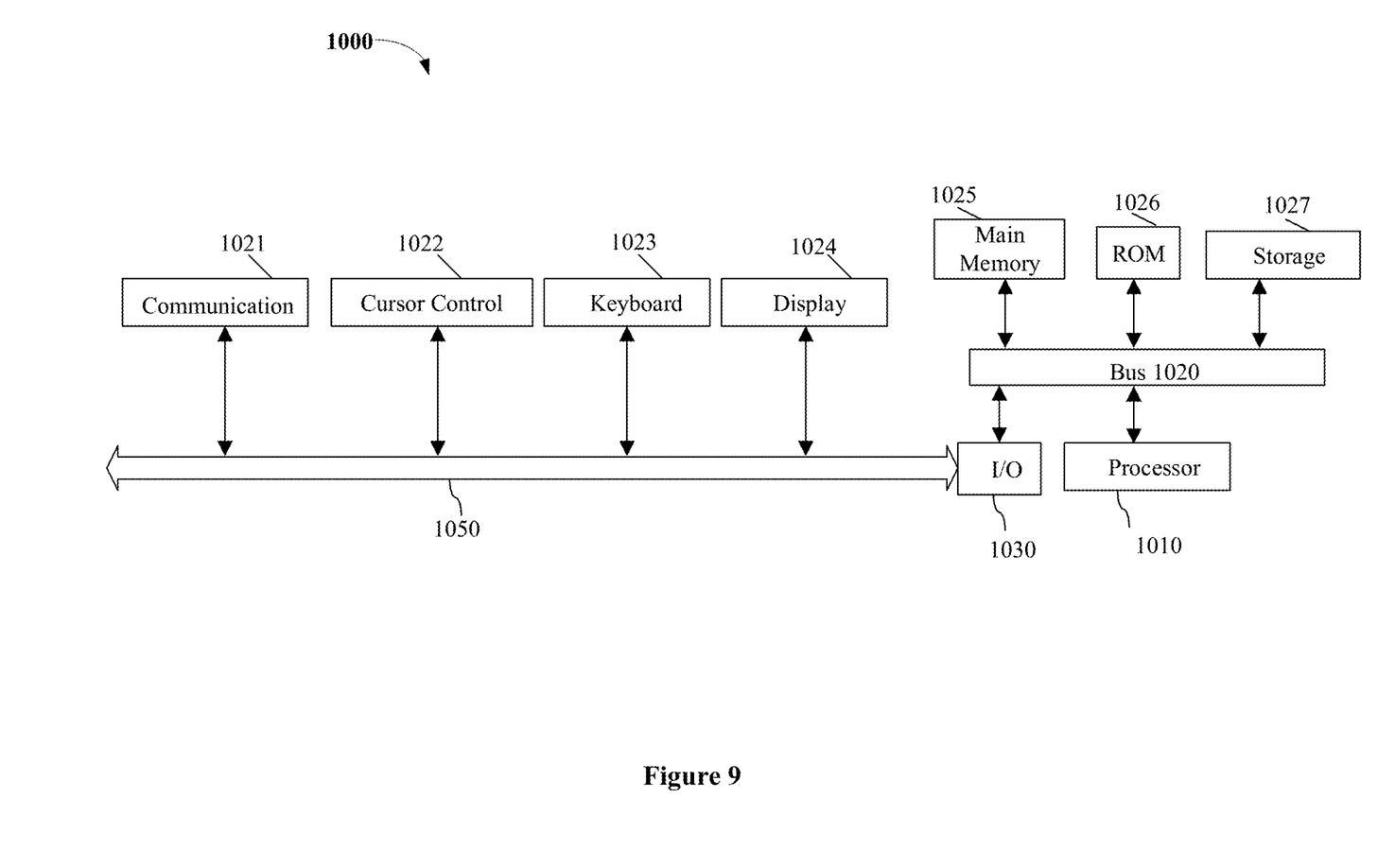
FIG. 9 illustrates one embodiment of a computer system.

FIG. 9 illustrates a computer system 1000 on which printing system 130 and/or halftone calibration module 216 may be implemented. Computer system 1000 includes a system bus 1020 for communicating information, and a processor 1010 coupled to bus 1020 for processing information.

Computer system 1000 further comprises a random access memory (RAM) or other dynamic storage device 1025 (referred to herein as main memory), coupled to bus 1020 for storing information and instructions to be executed by processor 1010. Main memory 1025 also may be used for storing temporary variables or other intermediate information during execution of instructions by processor 1010. Computer system 1000 also may include a read only memory (ROM) and or other static storage device 1026 coupled to bus 1020 for storing static information and instructions used by processor 1010.

A data storage device 1025 such as a magnetic disk or optical disc and its corresponding drive may also be coupled to computer system 1000 for storing information and instructions. Computer system 1000 can also be coupled to a second I/O bus 1050 via an I/O interface 1030. A plurality of I/O devices may be coupled to I/O bus 1050, including a display device 1024, an input device (e.g., an alphanumeric input device 1023 and or a cursor control device 1022). The communication device 1021 is for accessing other computers (servers or clients). The communication device 1021 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
a print controller to perform a calibration of a first pass channel and a second pass channel based on a combined compensation of a first component of an image data to print at a first set of pixel (pel) forming elements of the first pass channel and a second component of the image data to print at a second set of pel forming elements of the second pass channel, wherein the combined compensation is based on measurement data corresponding to a first of a plurality of regions printed on a print medium by the first pass channel and the second pass channel, the first set of pel forming elements are separate from the second set of pel forming elements, and wherein the first component of the image data and the second component of the image data occupy the first of the plurality of regions on the print medium, and each of the plurality of regions forms a column on the print medium.

2. The printing system of claim 1, further comprising a measurement module to obtain the measurement data for each pel forming element in the first and second set of pel forming elements.

3. The printing system of claim 1, wherein the print controller comprises a halftone calibration module to generate a first calibrated halftone for the first pass channel and a second calibrated halftone for the second pass channel based on the measurement data.

4. The printing system of claim 3, wherein generating the first and second calibrated halftones comprises receiving first and second un-calibrated halftones, transforming threshold values in the first and second un-calibrated halftones via an inverse transfer function to generate first and second calibrated halftone threshold values; and generating the first and second calibrated halftones based on the calibrated halftone threshold values.

5. The printing system of claim 4, wherein the halftone calibration module computes the inverse transfer function to achieve a target response based on the measurement data.

6. The printing system of claim 5, wherein the print controller further comprises a halftoning module to perform halftoning on the image data at the first pass channel using the first calibrated halftone and at the second pass channel using the second calibrated halftone.

7. The printing system of claim 6, wherein the first pass channel prints the first component of the image data using the first calibrated halftone and the second pass channel prints the second component of the image data using the second calibrated halftone.

8. The printing system of claim 1, wherein the image data is replicated for the first pass channel and the second pass channel.

9. The printing system of claim 6, wherein obtaining the measurement data comprises receiving test input image data, perform halftoning on the test input image data at the first pass channel using the first un-calibrated halftone and at the second pass channel using the second un-calibrated halftone and printing the test input image data at the first pass channel and the second pass channel.

10. The printing system of claim 1, wherein the print controller further performs color compensation by combining two or more colors.

11. The printing system of claim 1 further comprising:
a printer to print the image data to the print medium; including:
the first pass channel to print the first component of the image data; and
the second pass channel to print the second component of the image data.

12. The printing system of claim 1, wherein the first of the plurality of regions is a single pel width.

13. A method comprising:
performing a calibration of a first pass channel and the second pass channel based on a combined compensation of a first component of the image data to print at a first pass channel including a first set of one or more pixel (pel) forming elements and a second component of the image data to print at a second pass channel including a second set of one or more pel forming elements, wherein the first component of the image data and the second component of the image data occupy a first of a plurality of regions on the print medium, and each of the plurality of regions forms a column on a print medium, the first set of pel forming elements are separate from the second set of pel forming elements, and wherein the combined compensation is based on measurement data corresponding to a the first of the plurality of regions printed by the first pass channel and the second pass channel.

14. The method of claim 13, further comprising obtaining the measurement data for each pel forming element in the first and second set of pel forming elements.

15. The method of claim 13, further comprising:
generating a first calibrated halftone for the first pass channel; and
generating a second calibrated halftone for the second pass channel based on the measurement data.

16. The method of claim 15, wherein generating the first and second calibrated halftones comprises:
receiving first and second un-calibrated halftones;
transforming threshold values in the first and second un-calibrated halftones via an inverse transfer function to generate first and second calibrated halftone threshold values; and
generating the first and second calibrated halftones based on the calibrated halftone threshold values.

17. The method of claim 16, further comprising computing the inverse transfer function to achieve a target response based on the measurement data.

18. The method of claim 17, further comprising:
performing halftoning on the image data at the first pass channel using the first calibrated halftone; and
performing halftoning at the second pass channel using the second calibrated halftone.

19. The method of claim 15, wherein the first pass channel prints the first component of the image data using the first calibrated halftone and the second pass channel prints the second component of the image data using the second calibrated halftone.

20. The method of claim 13, wherein the image data is replicated for the first pass channel and the second pass channel.

21. The method of claim 18, wherein obtaining the measurement data comprises receiving test input image data, perform halftoning on the test input image data at the first pass channel using the first un-calibrated halftone and at the second pass channel using the second un-calibrated halftone and printing the test input image data at the first pass channel and the second pass channel.

22. The method of claim 13, further comprising performing color compensation by combining two or more colors.

23. The method of claim 13, wherein the first of the plurality of regions is a single pel width.

* * * * *